(12) United States Patent
Reigo et al.

(10) Patent No.: US 10,078,336 B2
(45) Date of Patent: Sep. 18, 2018

(54) SYSTEM AND METHOD FOR NAVIGATING A ROBOTIC WORKING TOOL

(71) Applicant: HUSQVARNA AB, Huskvarna (SE)

(72) Inventors: Peter Reigo, Djursholm (SE); Stefan Grufman, Bankeryd (SE)

(73) Assignee: Husqvarna AB, Huskvarna (SE)

(*) Notice: Subject to any disclaimer, the term of this patent is extended or adjusted under 35 U.S.C. 154(b) by 0 days.

(21) Appl. No.: 15/105,654

(22) PCT Filed: Dec. 19, 2013

(86) PCT No.: PCT/SE2013/051575
§ 371 (c)(1),
(2) Date: Jun. 17, 2016

(87) PCT Pub. No.: WO2015/094053
PCT Pub. Date: Jun. 25, 2015

(65) Prior Publication Data
US 2016/0334795 A1    Nov. 17, 2016

(51) Int. Cl.
*G05D 1/02* (2006.01)
*B60L 11/18* (2006.01)
(Continued)

(52) U.S. Cl.
CPC .......... *G05D 1/027* (2013.01); *A01D 34/008* (2013.01); *B60L 1/003* (2013.01); *B60L 11/14* (2013.01);
(Continued)

(58) Field of Classification Search
CPC ................. G05D 1/027; G05D 1/0278; G05D 2201/0208; G05D 2201/0203;
(Continued)

(56) References Cited

U.S. PATENT DOCUMENTS

| 4,024,382 A | 5/1977 | Fowler |
| 4,677,562 A * | 6/1987 | Uota ............... G01C 21/30 340/988 |

(Continued)

FOREIGN PATENT DOCUMENTS

| CN | 102506875 A | 6/2012 |
| CN | 102591342 A | 7/2012 |

(Continued)

OTHER PUBLICATIONS

Rogers, Robert M., "Proceedings of the 1997 National Technical Meeting of the Institute of Navigation," Jan. 14-16, 1997, all enclosed pages cited.

(Continued)

*Primary Examiner* — Abby Yee Lin
(74) *Attorney, Agent, or Firm* — McNair Law Firm, P.A.

(57) ABSTRACT

A robotic work tool system (200) comprising a robotic work tool (100), said robotic work tool (100) comprising a position determining device (190) for determining a current position, such as through receiving satellite signals, and a navigation device (195) arranged to at least provide a compass heading, the robotic work tool (100) being configured to: determine a compass heading (CH) obtained through the navigation device (195); compare the compass heading to a true heading (TH) obtained through the position determining device (190); determine an error (e) between the true heading (TH) and the compass heading (CH); determine a robot position (XR; YR); and store the error (e) for said robot position (XR; YR) thereby generating a magnetic correction matrix.

17 Claims, 3 Drawing Sheets

(51) Int. Cl.
*G01C 21/16* (2006.01)
*A01D 34/00* (2006.01)
*B60L 1/00* (2006.01)
*B60L 11/14* (2006.01)

(52) U.S. Cl.
CPC ....... *B60L 11/1805* (2013.01); *B60L 11/1816* (2013.01); *B60L 11/1824* (2013.01); *G01C 21/165* (2013.01); *G05D 1/0278* (2013.01); *B60L 2200/40* (2013.01); *B60L 2220/46* (2013.01); *B60L 2240/62* (2013.01); *B60L 2260/32* (2013.01); *G05D 2201/0203* (2013.01); *G05D 2201/0208* (2013.01); *Y02T 10/70* (2013.01); *Y02T 10/7005* (2013.01); *Y02T 10/7072* (2013.01); *Y02T 10/7077* (2013.01); *Y02T 10/7291* (2013.01); *Y02T 90/121* (2013.01); *Y02T 90/14* (2013.01); *Y02T 90/16* (2013.01); *Y02T 90/162* (2013.01)

(58) Field of Classification Search
CPC ... A01D 34/008; B60L 1/003; B60L 2220/46; B60L 2240/62; B60L 2260/32; B60L 11/14; B60L 11/1805; B60L 11/1816; B60L 11/1824; B60L 2200/40; G01C 21/165; Y02T 10/70; Y02T 10/7005; Y02T 10/7072; Y02T 10/7077; Y02T 10/7291; Y02T 90/121; Y02T 90/14; Y02T 90/16; Y02T 90/162
See application file for complete search history.

(56) References Cited

U.S. PATENT DOCUMENTS

| | | |
|---|---|---|
| 5,339,246 A | 8/1994 | Kao |
| 5,684,476 A | 11/1997 | Anderson |
| 6,446,003 B1 | 9/2002 | Green et al. |
| 6,956,525 B1* | 10/2005 | Chang .................... G01C 17/38 342/357.36 |
| 8,890,757 B1* | 11/2014 | Macy ..................... H01Q 1/125 343/713 |
| 2004/0078137 A1 | 4/2004 | Breakfield et al. |
| 2005/0038578 A1* | 2/2005 | McMurtry ........... A01B 79/005 701/25 |
| 2007/0156337 A1* | 7/2007 | Yanni .................. G01C 21/165 701/469 |
| 2008/0201096 A1 | 8/2008 | Wright et al. |
| 2013/0282274 A1 | 10/2013 | Hernando |

FOREIGN PATENT DOCUMENTS

| | | |
|---|---|---|
| DE | 102008011947 A1 | 9/2009 |
| EP | 0629877 A1 | 12/1994 |
| EP | 0966690 B1 | 11/2002 |
| WO | 2009106435 A1 | 9/2009 |

OTHER PUBLICATIONS

Bruch, Michael H., et al., "Accurate Waypoint Navigation Using Non-Differential GPS," Jul. 2002, all enclosed pages cited.

International Search Report and Written Opinion of International Application No. PCT/SE2013/051575 dated Sep. 9, 2014, all enclosed pages cited.

International Preliminary Report on Patentability of International Application No. PCT/SE2013/051575 dated Jun. 21, 2016, all enclosed pages cited.

* cited by examiner

SYSTEM AND METHOD FOR NAVIGATING A ROBOTIC WORKING TOOL

TECHNICAL FIELD

This application relates to a method and a robotic work tool system for an improved navigation for a robotic work tool. And in particular to a robotic work tool configured for satellite assisted navigation

BACKGROUND

Contemporary robotic work tools are becoming more and more advanced and are able to perform more and more advanced tasks such as executing advanced operation patterns. In the example of lawnmower robots the advanced working pattern may be a complicated mowing pattern based on the layout of a garden including bushes, garden islands and other structures. To successfully navigate such complicated areas some contemporary robotic work tools employ satellite navigation.

A satellite navigation or sat nav system is a system of satellites that provide autonomous geo-spatial positioning with global coverage. It allows small electronic receivers to determine their location (longitude, latitude, and altitude) to within a few meters, or even centimeters, using signals transmitted along a line-of-sight by radio from satellites. Receivers calculate the precise time as well as position and carrier phase, which can be used as a reference for scientific experiments. A satellite navigation system with global coverage may be termed a global navigation satellite system or GNSS (Global Navigation Satellite System).

The use of GNSS systems requires good reception of satellite signals to work reliably. The satellite signals may sometimes be blocked by buildings, roofs, awnings, foliage or trees. To improve the accuracy of GNSS systems a reference receiver, or beacon, within a short distance from the target receiver can be used. This is called differential GNSS. There are several DGNSS techniques, such as the classical DGNSS (or DGPS), the Real Time Kinematics (RTK) and the Wide Area RTK (WARTK).

However, the signal from a beacon may also be blocked by for example a house if the garden or other work area extends around the building.

It should be noted that similar problems exist also for other position determining devices, such as using optical beacons where the line of sight may be blocked in certain areas.

If the robotic work tool is unable to correctly receive the signals from the position determining system, the robotic work tool will be challenged to correctly navigate the work area and a satisfactory coverage of the work area may not be achieved by the robotic work tool.

A robotic work tool may be configured to use other navigation tools such as dead reckoning or deduced reckoning navigation systems when a satellite signal can not be received correctly.

Such navigation systems are well known and need no detailed description. Basically the robotic work tool determines its current position by determining a direction, for example through using a compass, and determining a distance travelled, for example by counting wheel turns.

However, such navigation is prone to mistakes due to environmental factors, such as slippery surfaces, causing the wheels to spin, magnetic influence, that may affect the compass, and other factors.

Especially the magnetic influence can affect compasses to a great degree and may also vary significantly over a work area. The magnetic influence may both be caused by external factors (such as the robotic work tool passing a magnetic object) or internal factors (such as battery placement).

Even though the problems above have been discussed for lawnmower robotic work tools, the same or similar problems exist also for other robotic work tools.

There is thus a need for a manner of enabling reliable operation of a robotic work tool even in situations where the robotic work tool may not be able to receive reliable and accurate positioning signals in all areas of a work area and where deduced reckoning may not be sufficiently reliant.

SUMMARY

It is an object of the teachings of this application to overcome the problems listed above by providing a robotic work tool system, comprising a robotic work tool, said robotic work tool comprising a position determining device for determining a current position, such as through receiving satellite signals, and a navigation device arranged to at least provide a compass heading, the robotic work tool being configured to determine a compass heading obtained through the navigation device, compare the compass heading to a true heading obtained through the position determining device, determine an error between the true heading and the compass heading, determine a robot position and store the error for said robot position thereby generating a magnetic correction matrix.

In one embodiment the robotic work tool is further configured to determine that reception of a satellite signal is no longer reliably received, determine a current robot position, start navigating via the navigation device, retrieve a correction value from the magnetic correction matrix for said current position and to adapt the compass heading accordingly.

In one embodiment the robotic work tool is a farming equipment, a vacuum cleaner, a floor cleaner, a street sweeper, a snow removal tool, a golf ball retriever robot, a cleaner robot, a leaves blower robot, a leaves collector robot, snow thrower robot or a mine clearance robot.

It is also an object of the teachings of this application to overcome the problems listed above by providing a method for use in a robotic work tool system comprising a robotic work tool, said robotic work tool comprising a position determining device for determining a current position, such as through receiving satellite signals, and a navigation device arranged to at least provide a compass heading, the method comprising determining a compass heading obtained through the navigation device, comparing the compass heading to a true heading obtained through the position determining device, determining an error between the true heading and the compass heading, determining a robot position and storing the error for said robot position thereby generating a magnetic correction matrix.

In one embodiment the method further comprises determining that reception of a satellite signal is no longer reliably received, determining a current robot position starting to navigate via the navigation device, retrieving a correction value from the magnetic correction matrix for said current position and adapting the compass heading accordingly.

The inventors of the present invention have realized, after inventive and insightful reasoning that by comparing directions at positions at for example which a signal to a satellite is received and comparing to a direction given by an external compass, a correction value for that position may be achieved. Further, as GNSS satellites are not stationary it will be possible to, over time, obtain correction values also in areas where satellite navigation is not always possible. In this manner, it will be possible to correct a compass reading even in an area that is currently shadowed with regards to satellite navigation if that area has been visited before when it was not shadowed. The robotic work tool may therefore be able to correct the deduced reckoning navigation more efficiently.

In one embodiment the robotic work tool only stores correction values when the satellite signal is received reliably.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
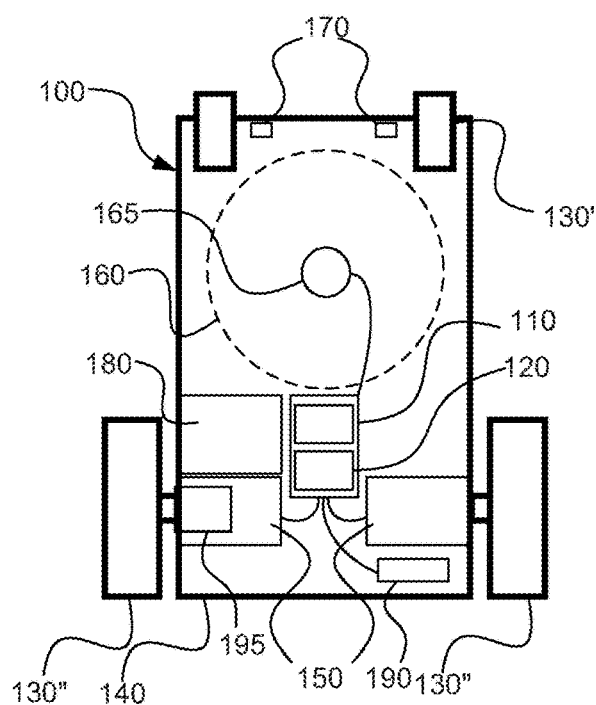
FIG. 1 shows a schematic overview of a robotic work tool according to one embodiment of the teachings of this application.

FIG. 1 shows a schematic overview of a robotic work tool 100 having a body 140 and a plurality of wheels 130. In the exemplary embodiment of FIG. 1 the robotic work tool 100 has 4 wheels 130, two front wheels 130' and the rear wheels 130". At least some of the wheels 130 are drivably connected to at least one electric motor 150. It should be noted that even if the description herein is focussed on electric motors, combustion engines may alternatively or additionally be used possibly in combination with an electric motor.

In the example of FIG. 1, the rear wheels 130" are connected to each an electric motor 150. This allows for driving the rear wheels 130" independently of one another which, for example, enables steep turning.

The robotic work tool 100 also comprises a controller 110. The controller 110 may be implemented using instructions that enable hardware functionality, for example, by using executable computer program instructions in a general-purpose or special-purpose processor that may be stored on a computer readable storage medium (disk, memory etc) 120 to be executed by such a processor. The controller 110 is configured to read instructions from the memory 120 and execute these instructions to control the operation of the robotic work tool 100. The controller 110 may be implemented using any suitable, publically available processor or Programmable Logic Circuit (PLC). The memory 120 may be implemented using any commonly known technology for computer-readable memories such as ROM, RAM, SRAM, DRAM, FLASH, DDR, SDRAM or some other memory technology.

The robotic work tool 100 further may have at least one sensor 170, in the example of FIG. 1 there are two sensors 170, arranged to detect a magnetic field (not shown). The sensors are connected to the controller 110 and the controller 110 is configured to process any signals received from the sensors 170. The sensor signals may be caused by the magnetic field caused by a control signal being transmitted through a boundary wire (for more details on charging stations, control signals and boundary wires, see the description below with reference to FIG. 2). This enables the controller 110 to determine whether the robotic work tool 100 is inside or outside an area enclosed by a boundary wire.

It should be noted that the teachings herein may also be used for a robotic work tool that is configured to operate in a work area, where the work area is not bounded by a boundary wire. Examples of such robotic work tools are tools arranged to physically detect a boundary by collision detection, or a robotic work tool that uses a position determination system (such as GNSS) to maintain a position within the work area, which work area is specified by coordinates.

The robotic work tool 100 is also arranged with a position determining device 190, such as a GNSS (Global Navigation Satellite System) device 190. In one embodiment the GNSS device is a GPS (Global Positioning Service) device 190. The GNSS device 190 is connected to the controller 110 for enabling the controller 110 to determine a current position for the robotic work tool 100 using the GNSS device and to control the movements of the robotic work tool 100 based on the position.

Alternatively, the robotic work tool 100 may be arranged to operate within the work area solely or mainly based on the position determining device 190. A user may then establish a work area through coordinates and the robotic work tool will ensure that it stays within those coordinates based on the signals received by the position determining device 190.

Other examples of position determining devices 190 include optical (such as laser) position determining devices and other radio frequency position determining systems.

The robotic work tool 100 is further arranged with at least one sensor 195 for providing signals for deduced reckoning navigation. Examples of such navigation sensors 195 are odometers, accelerometers, gyroscopes and especially a compass.

The deduced reckoning sensor(s) may be used to navigate in areas where satellite reception is not possible, i.e. areas hereafter referred to as shadowed areas.

The controller 110 is connected to the motors 150 for controlling the propulsion of the robotic work tool 100 which enables the robotic work tool 100 to service an enclosed area without leaving the area.

The robotic work tool 100 also comprises a work tool 160, which may be a grass cutting device, such as a rotating blade 160 driven by a cutter motor 165. The cutter motor 165 is connected to the controller 110 which enables the controller 110 to control the operation of the cutter motor 165. The controller is also configured to determine the load exerted on the rotating blade, by for example measure the power delivered to the cutter motor 165 or by measuring the axle torque exerted by the rotating blade. The robotic work tool 100 is, in one embodiment, a lawnmower robot. In one embodiment the robotic work tool 100 is a farming equipment. In one embodiment the robotic work tool 100 is a golf ball collecting tool.

The robotic work tool 100 may also be a vacuum cleaner, a floor cleaner, a street sweeper, a snow removal tool, a mine clearance robot or any other robotic work tool that is required to operate in a work area in a methodical and systematic or position oriented manner.

The robotic work tool 100 also has (at least) one battery 180 for providing power to the motors 150 and the cutter motor 165. Alternatively or additionally the robotic work tool may have a fuel tank 180 for supplying fuel to any other type of engine 150.

Figure 2:
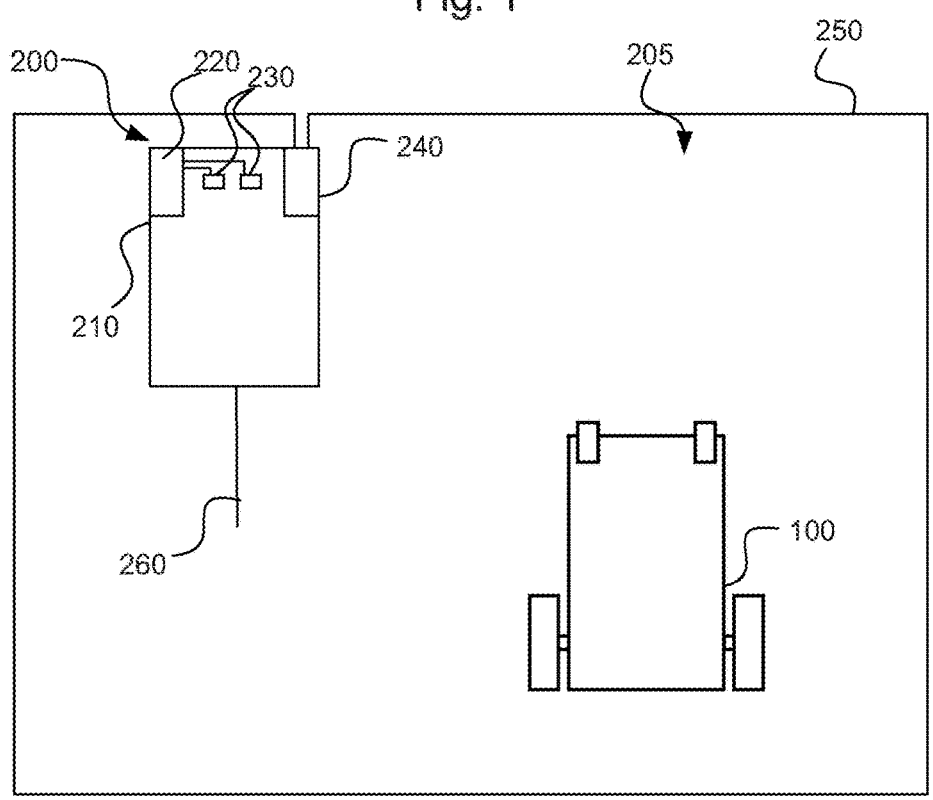
FIG. 2 shows a schematic view of a robotic working tool system according to one embodiment of the teachings of this application.

FIG. 2 shows a schematic view of a robotic work tool system 200 comprising a charging station 210 and a boundary wire 250 arranged to enclose a working area 205, the working area 205 not necessarily being a part of the robotic work tool system 200, in which the robotic work tool 100 is supposed to service. As stated above, the robotic work tool 100 may be arranged to operate solely using the position determining device in which case no boundary wire 250 nor signal generator (to be disclosed) is part of the system 200. The charging station 210 has a charger 220 coupled to, in this embodiment, two charging plates 230. The charging plates 230 are arranged to co-operate with corresponding charging plates (not shown) of the robotic work tool 100 for charging the battery 180 of the robotic work tool 100. The charging station 210 also has, or may be coupled to, a signal generator 240 for providing a control signal (not shown) to be transmitted through the boundary wire 250. As is known in the art, the control signal will generate a magnetic field around the boundary wire 250 which the sensors 170 of the robotic work tool 100 will detect. As the robotic work tool 100 (or more accurately, the sensor 170) crosses the boundary wire 250 the direction of the magnetic field will change. The robotic work tool 100 will thus be able to determine that the boundary wire has been crossed. The use of more than one sensor 170 enables the controller 110 of the robotic work tool 100 to determine how the robotic work tool 100 is aligned with relation to the boundary wire 250 by comparing the sensor signals received from each sensor 170. This enables the robotic work tool to follow the boundary wire 250, for example when returning to the charging station 210 for charging.

Optionally, the charging station 210 also has a guide cable 260 for enabling the robotic work tool to find the entrance of the charging station 210. In one embodiment the guide cable 260 is formed by a loop of the boundary wire 250. In one embodiment the guide wire 260 is used to generate a magnetic field for enabling the robotic work tool 100 to find the charging station without following a guide cable 260.

Figure 3:
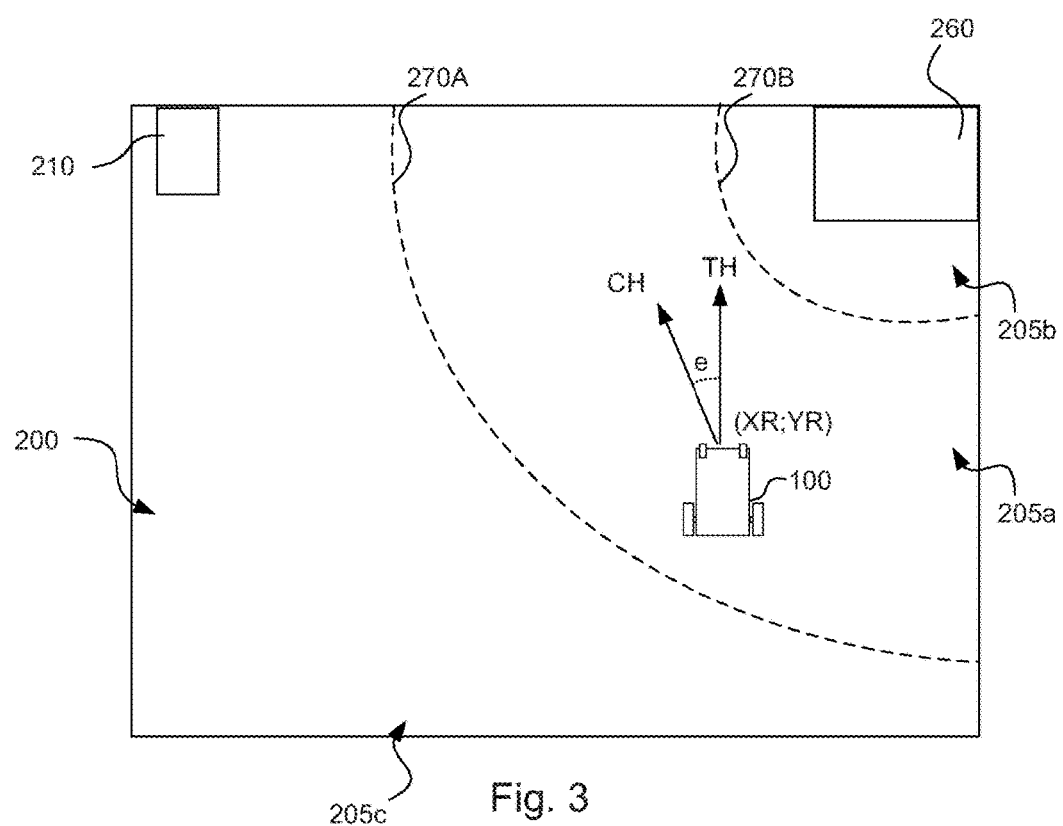
FIG. 3 shows a schematic view of a robotic working tool system in operation according to one embodiment of the teachings of this application.

FIG. 3 shows another schematic view of a robotic work tool system 200 according to the teachings herein, such as the robotic work tool system 200 of FIG. 2, being depicted here at a larger scale.

The work area 205 is shown here to include one object 260. It should be noted that there may be more than one object 260 and that the objects(s) 260 may also be located outside the work area 205.

Some areas will sometimes be blocked with regards to satellite signals that are to be received from satellites (not shown in FIG. 3) which cause shadowed areas 205 a and 205 b to occur in the work area. The shadowed areas 205 a, 205 b are shadowed in that they are areas where signal reception from a satellite is not possible as the robotic work tool is within a satellite signal shadow of an obstacle such as a house, a roof or leafage.

In one embodiment, an area may be determined as being shadowed if the area is such that it is inappropriate for use with the position determining system. It should be noted that, although the description herein is focused on a position determining system based on GNSS satellite reception, the teachings herein may also be applied to other position determining systems, that may work inaccurately in certain areas.

As GNSS satellites are not stationary these shadowed areas 205a, 205b may vary in size and extension. In FIG. 3 the shadowed areas 205a and 205b are indicated by their borders, hereafter referred to as shadow borders 270A and 270B respectively. The shadow border is thus a position at which a signal may not be received correctly from a satellite any longer (at a given time).

To enable the robotic work tool 100 to navigate successfully even when operating in a (temporary) shadowed area 205a, the robotic work tool 100 is configured to determine a compass heading (indicated CH in FIG. 3) obtained through the navigation device 195 and compare it to a true heading (indicated TH in FIG. 3) obtained through the position determining device 190, which will be exemplified as being a GNSS position determining device. If there is an object emitting a magnetic field close by the compass heading CH may not correspond to the true heading TH as the compass is affected by the magnetic field. An error (indicated e in FIG. 3) can thus be determined as the difference between the true heading TH and the compass heading CH. The robotic work tool 100 is further configured to store the error e for the current robot position (XR; YR) thereby creating a matrix (or other storage structure) of magnetic corrections per position in the work area, that will, over time, cover all or most of the work area 205. The matrix will hereafter be referred to as a magnetic correction matrix.

In one embodiment the controller 110 is configured to continuously or repeatedly update the magnetic correction matrix.

The robotic work tool 100 is thus able to determine that it can no longer receive a signal correctly and in response thereto start navigating via the navigation device 195. To improve the reliability of the navigation device 195, the robotic work tool is configured to retrieve a correction value from the magnetic correction matrix for a current position and to adapt the compass heading (CH) accordingly.

In one embodiment the robotic work tool 100 is arranged to retrieve the correction value from the magnetic correction matrix continuously. This ensures a reliable operation. In one embodiment the robotic work tool 100 is arranged to retrieve the correction value from the magnetic correction matrix at intervals. One example interval is 1, 2, 5 or up to 10 seconds. Another or alternative example is 1, 2 or up to 5 meters. This reduces the demand on the controller 110.

In one embodiment the robotic work tool 100 is configured to determine that a correction value e is not available for the current robot position and in response thereto for example use the latest retrieved correction value as the correction value eto be added to the compass heading.

In one embodiment the robotic work tool 100 is configured to determine that a correction value e is not available for the current robot position and in response thereto estimate a next available correction value e, by searching the magnetic correction matrix for a correction value that corresponds to a position that is on a current path of the robotic work tool 100. The path can be determined using the last corrected compass heading (CH+e). The robotic work tool 100 is configured to use such a predicted correction value as the correction value to be added to the compass heading.

In one embodiment the robotic work tool 100 is configured to determine an average of the last used correction value and a predicted correction value and use the average correction value as the correction value to be added to the compass heading.

In one embodiment the robotic work tool 100 is configured to determine that a correction value e is not available for the current robot position and in response thereto calculate (or retrieve an already calculated and stored) average correction value for the magnetic correction matrix, and use the average correction value as the correction value to be added to the compass heading.

In one embodiment the robotic work tool 100 is configured to determine that a correction value e is not available for the current robot position and in response thereto determine an area currently being worked in and calculate (or retrieve an already calculated and stored) an average correction value for the currently worked in area from the magnetic correction matrix, and use the average correction value as the correction value to be added to the compass heading. The area currently worked in may be determined by the robotic work tool 100 (over time) noting positions in the magnetic correction matrix where satellite signals may not always be readily received. This will (over time) generate clusters of positions in the magnetic correction matrix that belong to an area and an area can thus be identified in the magnetic correction matrix by grouping such clusters.

In one embodiment the robotic work tool 100 is configured to continuously update the magnetic correction matrix to accommodate for changes in the environment. An object may for example be removed upon which a magnetic field may no longer be present in an area whereby the correction values for that area are no longer applicable.

In one embodiment the robotic work tool 100 is further configured to store a time point for each position. This enables the robotic work tool 100 to compare a current time with the time point for a position and to select a correction value corresponding to the position and the time point. This enables the robotic work tool 100 to accommodate for regular changes in the environment. One example of such a change is when a vehicle, such as a car is only present during evenings on weekdays and all days on weekends. The robotic work tool 100 may thereby be able to accommodate for the movements of the vehicle when operating in the work area 205.

Over time the magnetic correction matrix will comprise correction values for most of the work area and only very small areas will be without a specific correction value. As these areas are small, a minor error will not affect the navigation to a large extent, and the whole work area may be navigated to a satisfactory degree.

This has one benefit in that the robotic work tool 100 is enabled to navigate more reliably even when no satellite signals are receivable, the boundary wire may not be needed which will greatly simplify installation (and reinstallation) of a robotic work tool system.

Another benefit of the teachings herein is that a robotic work tool is enabled to provide a satisfactory mowing pattern even if the robotic work tool 100 is not able to receive a reliable signal from a satellite all the time and/or in all areas.

Figure 4:
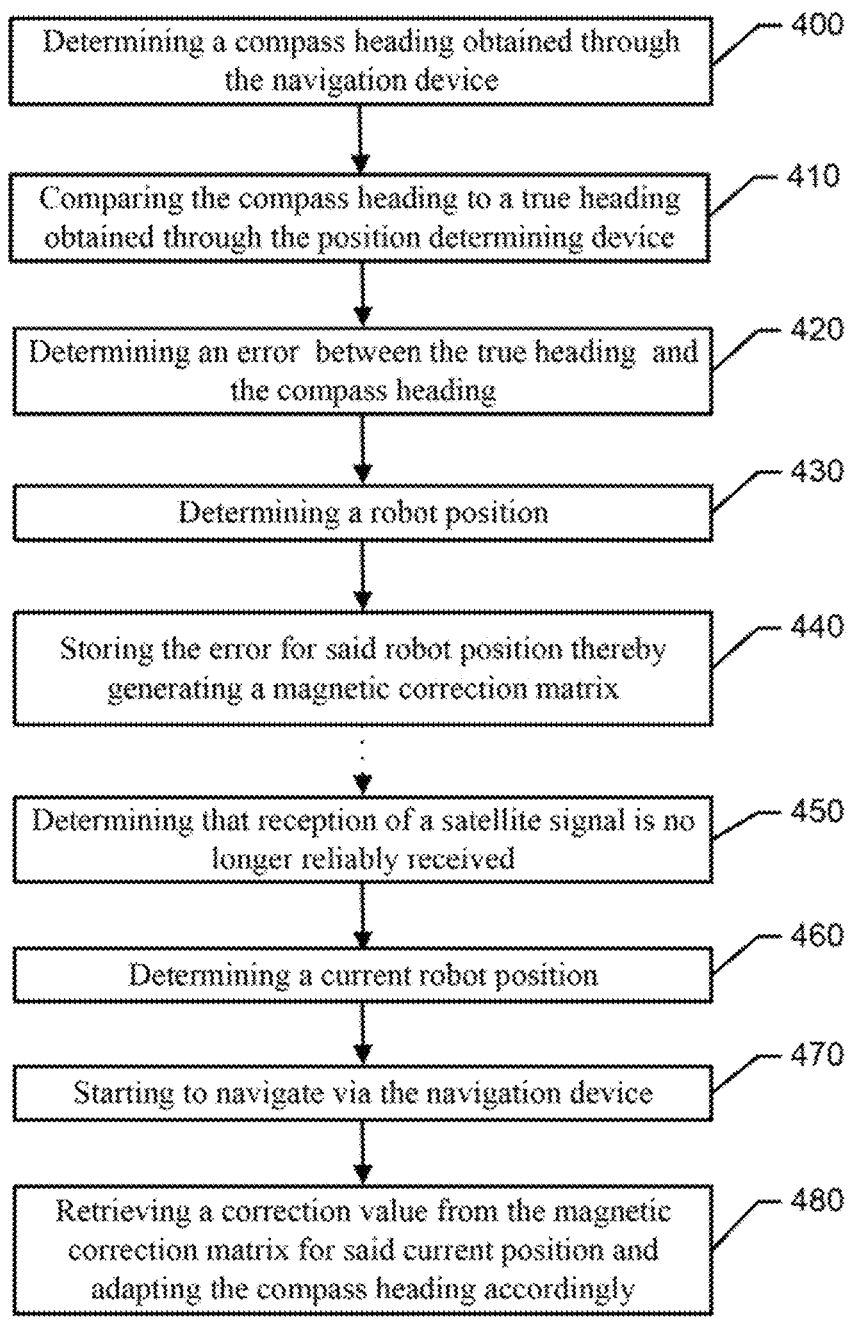
FIG. 4 shows a method for use in a robotic work tool system.

FIG. 4 shows a method for use in a robotic work tool system comprising a robotic work tool, said robotic work tool comprising a position determining device for determining a current position, such as through receiving satellite signals, and a navigation device arranged to at least provide a compass heading. The method comprises, at 400, determining a compass heading obtained through the navigation device; at 410, comparing the compass heading to a true heading obtained through the position determining device; at 420, determining an error between the true heading and the compass heading; at 430, determining a robot position; and, at 440, storing the error for said robot position thereby generating a magnetic correction matrix. The method may further comprise, at 450, determining that reception of a satellite signal is no longer reliably received; at 460, determining a current robot position; at 470, starting to navigate via the navigation device; and, at 480, retrieving a correction value from the magnetic correction matrix for said current position and adapting the compass heading accordingly.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A robotic work tool system comprising a robotic work tool, the robotic work tool comprising:
    a position determining device configured to determine a position, via receiving satellite signals;
    a navigation device configured to at least provide a compass heading; and
    a controller of the robotic work tool being configured to:
        determine a compass heading obtained through the navigation device;
        compare the compass heading to a true heading obtained through the position determining device;
        determine a heading error between the true heading and the compass heading;
        determine the position of the robotic work tool;
        store the heading error in association with the position of the robotic work tool; and
        include the heading error and the position in a magnetic correction matrix comprising heading errors for past positions of the robotic work tool.

2. The robotic work tool system according to claim 1, wherein the controller of the robotic work tool is further configured to:
    determine that a satellite signal is no longer received at a current time;
    determine a current position of the robotic work tool;
    start navigating via the navigation device;
    retrieve a correction value from the magnetic correction matrix for the current position; and
    adapt the compass heading accordingly.

3. The robotic work tool system according to claim 2, wherein the controller of the robotic work tool is configured to retrieve the correction value from the magnetic correction matrix continuously.

4. The robotic work tool system according to claim 2, wherein the controller of the robotic work tool is configured to retrieve the correction value from the magnetic correction matrix at intervals.

5. The robotic work tool system according to claim 2, wherein the controller of the robotic work tool is further configured to determine that a correction value is not available for the current position of the robotic work tool and in response thereto use a latest retrieved correction value as the correction value with which to adapt the compass heading.

6. The robotic work tool system according to claim 2, wherein the controller of the robotic work tool is further configured to determine that a correction value is not available for the current position of the robotic work tool and in response thereto:
   estimate a next available correction value, by searching the magnetic correction matrix for a correction value that corresponds to a position that is on a current path of the robotic work tool; and
   use the estimated next available correction value as the correction value with which to adapt the compass heading.

7. The robotic work tool system according to claim 2, wherein the controller of the robotic work tool is further configured to determine that a correction value is not available for the current position of the robotic work tool and in response thereto:
   estimate a next available correction value, by searching the magnetic correction matrix for a correction value that corresponds to a position that is on a current path of the robotic work tool;
   determine an average of a last used correction value and the estimated next available correction value; and
   use the average correction value as the correction value with which to adapt the compass heading.

8. The robotic work tool system according to claim 2, wherein the controller of the robotic work tool is further configured to determine that a correction value is not available for the current position of the robotic work tool and in response thereto:
   determine an average correction value for the magnetic correction matrix; and
   use the average correction value as the correction value with which to adapt the compass heading.

9. The robotic work tool system according to claim 2, wherein the controller of the robotic work tool is further configured to determine that a correction value is not available for the current position of the robotic work tool and in response thereto:
   determine an area currently being worked in;
   determine an average correction value for the currently worked in area from the magnetic correction matrix; and
   use the average correction value as the correction value with which to adapt the compass heading.

10. The robotic work tool system according to claim 1, wherein the controller of the robotic work tool is configured to continuously or at intervals update the magnetic correction matrix to accommodate for changes in environment.

11. The robotic work tool system according to claim 1, wherein the controller of the robotic work tool is further configured to:
    store a time point in association with the position of the robotic work tool in the magnetic correction matrix;
    after the robotic work tool moves from the position, compare a current time with the time point for a current position in the magnetic correction matrix;
    select a correction value, in response to determining that the satellite signals are no longer received, corresponding to the current position and the current time; and
    use the selected correction value to adapt the compass heading.

12. The robotic work tool system according to claim 1, wherein the position determining device is a Global Navigation Satellite System device.

13. The robotic work tool system according to claim 1, wherein the robotic work tool is a robotic lawnmower.

14. The robotic work tool system according to claim 1, wherein the robotic work tool is a farming equipment, a vacuum cleaner, a floor cleaner, a street sweeper, a snow removal tool, a golf ball retriever robot, a cleaner robot, a leaves blower robot, a leaves collector robot, snow thrower robot or a mine clearance robot.

15. A method for use in a robotic work tool system, comprising a robotic work tool, the robotic work tool comprising a position determining device configured to determine a position through receiving satellite signals, and a navigation device configured to at least provide a compass heading, the method comprising:
    determining a compass heading obtained through the navigation device;
    comparing the compass heading to a true heading obtained through the position determining device;
    determining heading error between the true heading and the compass heading;
    determining the position of the robotic work tool;
    storing the heading error in association with the position of the robotic work tool; and
    include the heading error and the position in a magnetic correction matrix comprising heading errors for past positions of the robotic work tool.

16. The method according to claim 15, wherein the method further comprises:
    determining that a satellite signal is no longer received at a current time;
    determining a current position of the robotic work tool;
    starting to navigate via the navigation device;
    retrieving a correction value from the magnetic correction matrix for the current position; and
    adapting the compass heading accordingly.

17. A robotic work tool system comprising a robotic work tool, the robotic work tool comprising:
    a position determining device configured to determine a position, via receiving satellite signals;
    a navigation device configured to at least provide a compass heading; and
    a controller of the robotic work tool being configured to:
       determine a compass heading obtained through the navigation device;
       compare the compass heading to a true heading obtained through the position determining device;
       determine a heading error between the true heading and the compass heading;
       determine the position of the robotic work tool;
       store the heading error in association with the position of the robotic work tool;
       include the heading error and the position in a magnetic correction matrix comprising heading errors for past positions of the robotic work tool;
       determine, after the robotic work tool moves from the position, that a correction value in the magnetic correction matrix is not available for a current position of the robotic work tool and in response thereto:
          determine an area currently being worked in;

determine an average correction value for the currently worked in area from the magnetic correction matrix; and
use the average correction value as the correction value with which to adapt the compass heading, in response to determining that a satellite signal is no longer received.

\* \* \* \* \*